(12) United States Patent
Chung et al.

(10) Patent No.: US 11,681,370 B2
(45) Date of Patent: Jun. 20, 2023

(54) HANDHELD CONTROLLER AND CONTROL METHOD

(71) Applicant: HTC Corporation, Taoyuan (TW)

(72) Inventors: Yu-Hsun Chung, Taoyuan (TW); Chen-Fu Chang, Taoyuan (TW)

(73) Assignee: HTC Corporation, Taoyuan (TW)

(*) Notice: Subject to any disclaimer, the term of this patent is extended or adjusted under 35 U.S.C. 154(b) by 0 days.

(21) Appl. No.: 17/701,679

(22) Filed: Mar. 23, 2022

(65) Prior Publication Data
US 2023/0081768 A1 Mar. 16, 2023

Related U.S. Application Data

(60) Provisional application No. 63/244,745, filed on Sep. 16, 2021.

(51) Int. Cl.
*G06F 3/03* (2006.01)
*G06F 3/01* (2006.01)
*G06F 3/0346* (2013.01)

(52) U.S. Cl.
CPC ............ *G06F 3/014* (2013.01); *G06F 3/0346* (2013.01)

(58) Field of Classification Search
CPC ................................ G06F 3/014; G06F 3/0346
See application file for complete search history.

(56) References Cited

U.S. PATENT DOCUMENTS 5,982,354 A * 11/1999 Arita ..................... A63F 13/219
345/157
2013/0106674 A1 * 5/2013 Wheeler ............ G02B 27/0101
345/8
2016/0364011 A1 * 12/2016 Bohn ..................... G06F 3/0485
2020/0401245 A1 * 12/2020 Munakata ............. G06F 3/0346

FOREIGN PATENT DOCUMENTS

| CN | 109725782 | | 5/2019 | |
|---|---|---|---|---|
| CN | 111930223 | | 11/2020 | |
| CN | 112512648 | | 3/2021 | |
| CN | 112740149 | | 4/2021 | |
| CN | 110456922 B | * | 7/2021 | ........... G06F 3/0236 |
| WO | 2007073811 | | 7/2007 | |

OTHER PUBLICATIONS

"Wacom VR Pen", retrieved from "https://developer.wacom.com/en-us/wacomvrpen", pp. 1-3.
"Airbrush Pen KP400E2", retrieved from "https://estore.wacom.com/en-us/wacom-airbrush-pen-kp400e2.html", pp. 1-2.
"Office Action of Taiwan Counterpart Application", dated Jan. 9, 2023, p. 1-p. 8.

* cited by examiner

*Primary Examiner* — Towfiq Elahi
(74) *Attorney, Agent, or Firm* — JCIPRNET

(57) ABSTRACT

A handheld controller is suitable for controlling a virtual reality system. The handheld controller has a pointer direction corresponding to the virtual reality system. The handheld controller includes a holding portion, a knob, and a positioning module. The holding portion is suitable to be held by a hand of a user. The knob is pivotally connected to the holding portion on a rotation axis. The rotation axis is coaxial with or parallel to the pointer direction. The positioning module is connected to the holding portion and is configured to provide a position of the holding portion in a three-dimensional space. In addition, a control method is also provided here.

9 Claims, 5 Drawing Sheets

HANDHELD CONTROLLER AND CONTROL METHOD

CROSS-REFERENCE TO RELATED APPLICATION

This application claims the priority benefit of U.S. provisional application Ser. No. 63/244,745, filed on Sep. 16, 2021. The entirety of the above-mentioned patent application is hereby incorporated by reference herein and made a part of this specification.

BACKGROUND

Technical Field

The disclosure relates to a controller, and in particular relates to a handheld controller and a control method.

Description of Related Art

Virtual reality (VR) technology has become more and more prevalent, and a handheld controller is commonly seen as an input device thereof. A user typically controls the action by pressing buttons on the handheld controller. The current handheld controllers used for VR are based on the design of traditional gaming handles, which are not specifically designed for image creation or business use, so the operation lacks precision and efficiency.

SUMMARY

The disclosure provides a handheld controller for controlling a virtual reality system.

The disclosure provides a control method for controlling a virtual reality system.

A handheld controller of the disclosure is suitable for controlling a virtual reality system. The handheld controller has a pointer direction corresponding to the virtual reality system. The handheld controller includes a holding portion, a knob, and a positioning module. The holding portion is suitable to be held by a hand of a user. The knob is pivotally connected to the holding portion on a rotation axis. The rotation axis is coaxial with or parallel to the pointer direction. The positioning module is connected to the holding portion and is configured to provide a position of the holding portion in a three-dimensional space.

A control method of the disclosure is suitable for controlling a virtual reality system. The virtual reality system includes a head-mounted display and a handheld controller. The head-mounted display is suitable for displaying an image. The handheld controller includes a holding portion, a knob, a microcontroller, a positioning module, and a transmission module. The microcontroller is electrically connected to the knob, the positioning module, and the transmission module. The holding portion is suitable to be held by a hand of a user. The knob is pivotally connected to the holding portion on a rotation axis. The rotation axis is coaxial with or parallel to the pointer direction. The knob generates angle data. The positioning module is connected to the holding portion for providing a position of the holding portion in a three-dimensional space. The positioning module generates position data. The transmission module is suitable for wireless transmission with the head-mounted display. The control method includes changing the image displayed by the head-mounted display based on the angle data and/or the position data.

Based on the above, in the disclosure, since the pointer direction of the handheld controller is coaxial with or parallel to the rotation axis of the knob, the user may output angle data by simultaneously moving the pointer direction of the handheld controller and rotating the knob, to provide rotational adjustment. In addition, the image displayed by the head-mounted display is changed according to the angle data generated by the knob, to provide more precise control of the virtual reality system.

DETAILED DESCRIPTION OF DISCLOSED EMBODIMENTS

Figure 1A:
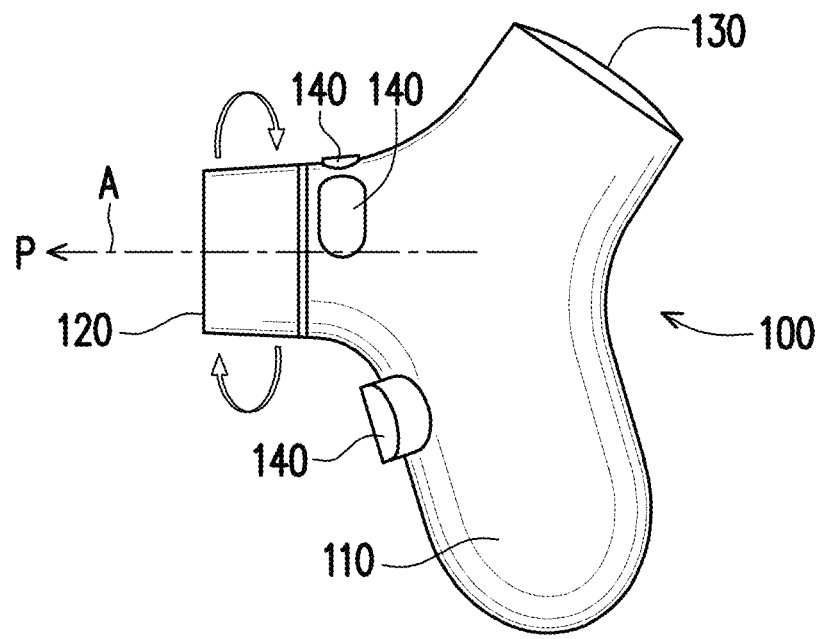
FIG. 1A is a schematic diagram of a handheld controller according to an embodiment of the invention.
Figure 1B:
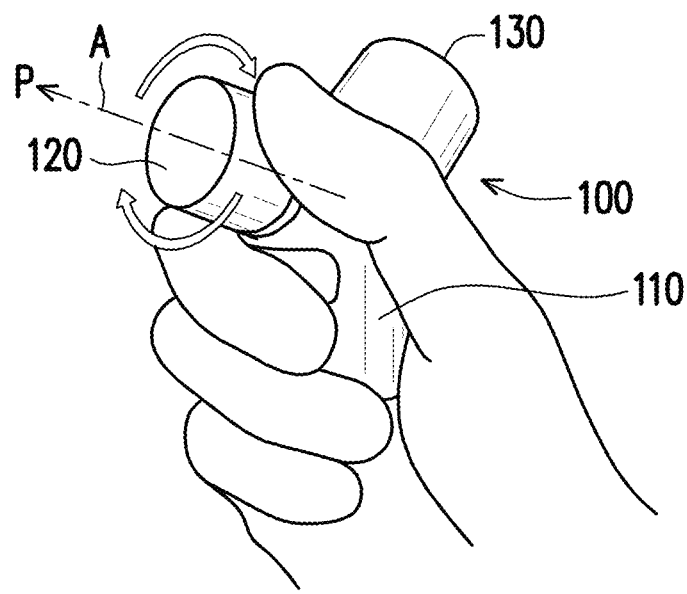
FIG. 1B is a schematic diagram of the handheld controller of FIG. 1A when being held.
Figure 1C:
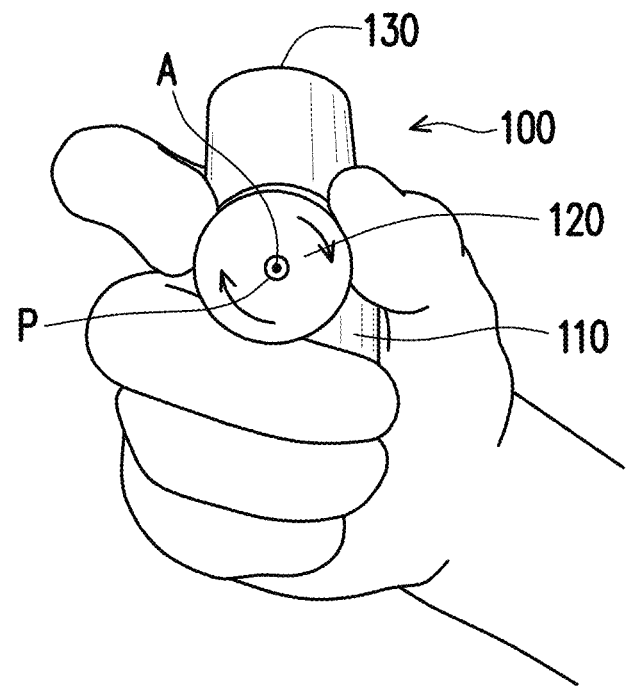
FIG. 1C is a schematic diagram of another viewing angle of the handheld controller of FIG. 1B when being held.

Referring to FIG. 1A, FIG. 1B, and FIG. 1C, in this embodiment, a handheld controller 100 is suitable for controlling a virtual reality system. The handheld controller 100 has a pointer direction P corresponding to the virtual reality system. The handheld controller 100 includes a holding portion 110, a knob 120, and a positioning module 130. The holding portion 110 is suitable to being held by a hand of a user. The knob 120 is pivotally connected to the holding portion 110 on a rotation axis A. The rotation axis A is coaxial with the pointer direction P. The knob 120 may be a rotation switch. The positioning module 130 is connected to the holding portion 110 for providing a position of the holding portion 110 in a three-dimensional space. In this embodiment, the holding portion 110, the knob 120, and the positioning module 130 may be arranged in a Y-shape. In other embodiments, the holding portion 110, the knob 120, and the positioning module 130 may also be arranged in other ways, as long as the rotation axis A where the knob 120 is located is coaxial with the pointer direction P of the handheld controller 100, but not limited thereto. The handheld controller 100 also has one or more buttons 140. The button 140 may be a push switch. The button 140 is disposed on the holding portion 110 for the user to press to generate pressing data, such as confirming a certain option or other functions. In another embodiment, the rotation axis A and the pointer direction P may also be parallel.

In detail, the shape of the holding portion 110 may be a shape suitable to being held by a palm of the user. When the user holds the handheld controller 100, the thumb and index finger may be pressed against the knob 120, and the palm and other fingers may be pressed against the holding portion 110. Therefore, the knob 120 may be rotated by a single finger of the user, adjusted by the thumb and the index finger simultaneously, or adjusted by the thumb, the index finger, and the middle finger simultaneously. The button 140 is disposed on the holding portion 110 where fingers may reach, to facilitate in the button pressing by the user. In this embodiment, the knob 120 is pivotally connected to the holding portion 110 on the rotation axis A, and the rotation axis A is coaxial with the pointer direction P of the handheld controller 100. Therefore, the user may not only control the pointer direction P of the virtual reality system 10 by moving the handheld controller 100, but also control the pointed target by simultaneously rotating the knob 120.

On the other hand, the positioning module 130 includes an inertial measurement unit, a point light source, a point light source array, a patterned light source, a light sensing array, or at least one camera lens. For example, the positioning module 130 may be an inertial measurement unit (IMU) with six axes. The six axes include accelerometers for the X, Y, and Z axis and gyroscopes for the X, Y, and Z axis. The positioning module 130 may also be an inertial measurement unit (IMU) with nine axes. The nine axes include accelerometers for the X, Y, and Z axis, gyroscopes for the X, Y, and Z axis, and magnetometers for the X, Y, and Z axis. In addition, the positioning module 130 may also be a single point light source, a point light source array, or a patterned light source, so as to allow an external camera lens to capture images. The positioning module 130 may also be a light sensor array, so as to receive light signals emitted from external light sources. Likewise, the positioning module 130 may also include various combinations of the above-mentioned various technologies. Specifically, the inertial measurement unit with six axes or nine axes may be assembled inside the holding portion 110. The point light source array or the patterned light source may be combined on the outside of the holding portion 110 so as to allow an external camera lens to capture images. The light sensing array may also be combined on the outside of the holding portion 110 so as to detect the light signal emitted from external light sources. The camera lens may also be combined on the outside of the holding portion 110 so as to detect the external environment.

Figure 2:
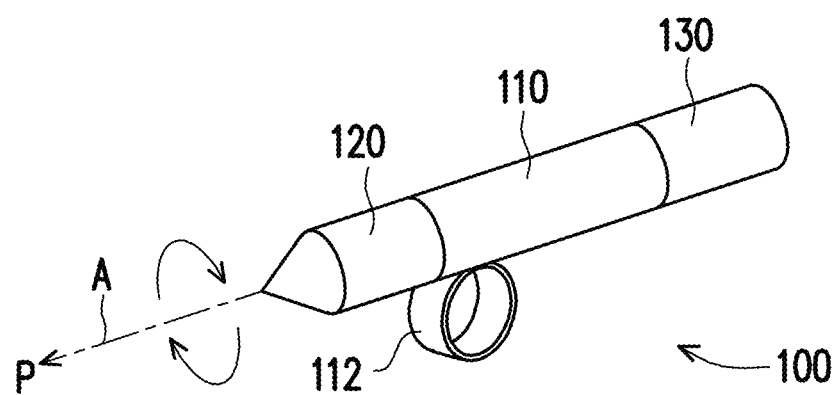
FIG. 2 is a schematic diagram of a handheld controller according to another embodiment of the invention.

Referring to FIG. 2, the embodiment of FIG. 2 is substantially the same as the embodiment of FIG. 1A. Compared with the embodiment of FIG. 1A, the holding portion 110, the knob 120, and the positioning module 130 of the handheld controller 100 of the embodiment of FIG. 2 are arranged in an I-shape. The handheld controller 100 has a wearable portion 112. The wearable portion 112 is disposed on the holding portion 110. In detail, in this embodiment, the knob 120 and the positioning module 130 are disposed on opposite ends of the holding portion 110, and the wearable portion 112 is disposed below the holding portion 110. When the user holds the handheld controller 100, the middle finger may pass through the wearable portion 112 to fix the handheld controller 100 on the hand.

Figure 3:
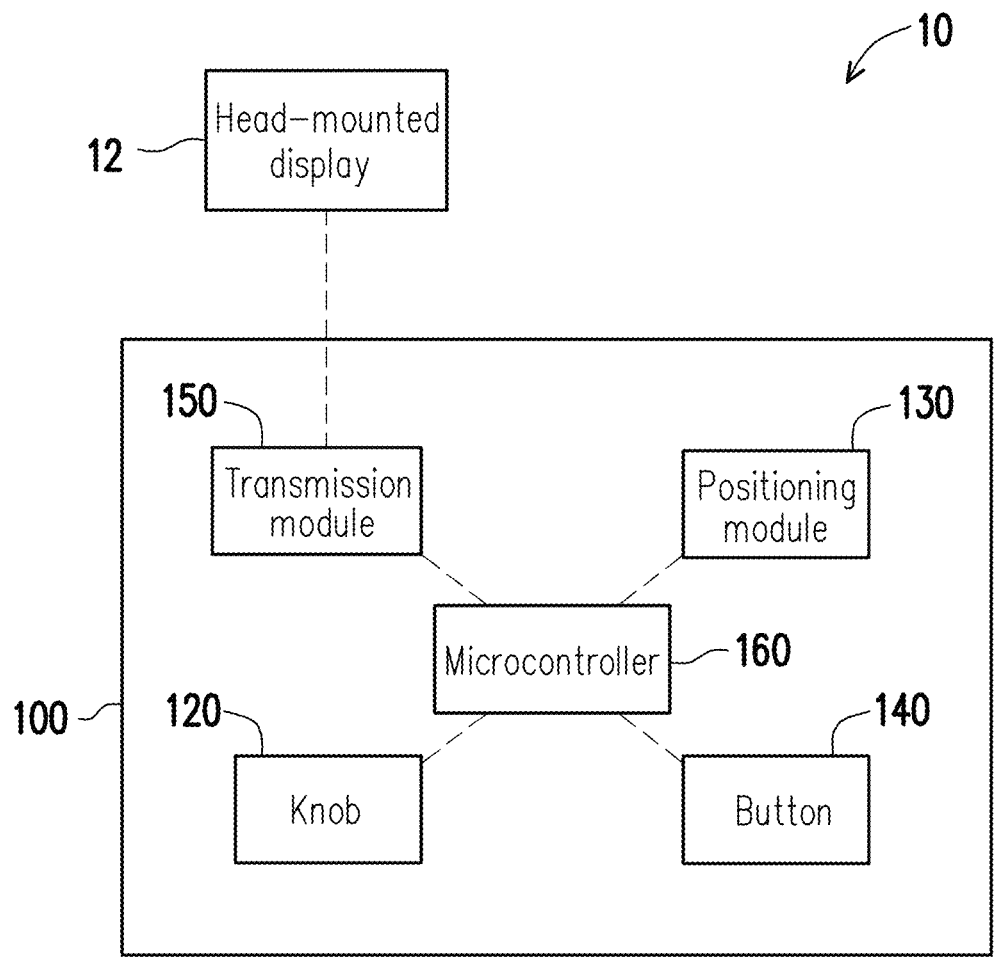
FIG. 3 is a block diagram of the handheld controller of FIG. 1A applied to a virtual reality system.

Referring to FIG. 3, in this embodiment, the virtual reality system 10 includes a head-mounted display 12 and the handheld controller 100 of FIG. 1A. The head-mounted display 12 is suitable for displaying an image. The handheld controller 100 may further include a transmission module 150 and a microcontroller 160. The microcontroller 160 is electrically connected to the knob 120, the positioning module 130, the button 140, and the transmission module 150. The microcontroller 160 transmits the signals (i.e., the angle data, the position data, and the pressing data) transmitted from the knob 120, the positioning module 130, and the button 140 to the head-mounted display 12 via the transmission module 150. The head-mounted display 12 performs calculations, and figures out the position change of the positioning module 130 (i.e., the handheld controller 100) in the three-dimensional space, the angle change of the knob 120 that is rotated, and whether the button 140 is pressed or the degree to which the button 140 is pressed.

During operation, the head-mounted display 12 may change the displayed image based on the angle data and/or the position data, and the pressing data. The calculation of the angle data, the position data, and the pressing data may be performed not only by the head-mounted display 12 but also by an external processor or cloud computing. Regarding the image displayed by the head-mounted display 12, it may be changed by the head-mounted display 12, an external processor, or cloud computing based on a portion of or all of the angle data, the position data, and the pressing data. In other words, the head-mounted display 12, an external processor, or cloud computing may change the image displayed by the head-mounted display 12 based on a portion of or all of the angle data, the position data, and the pressing data.

Figure 4:
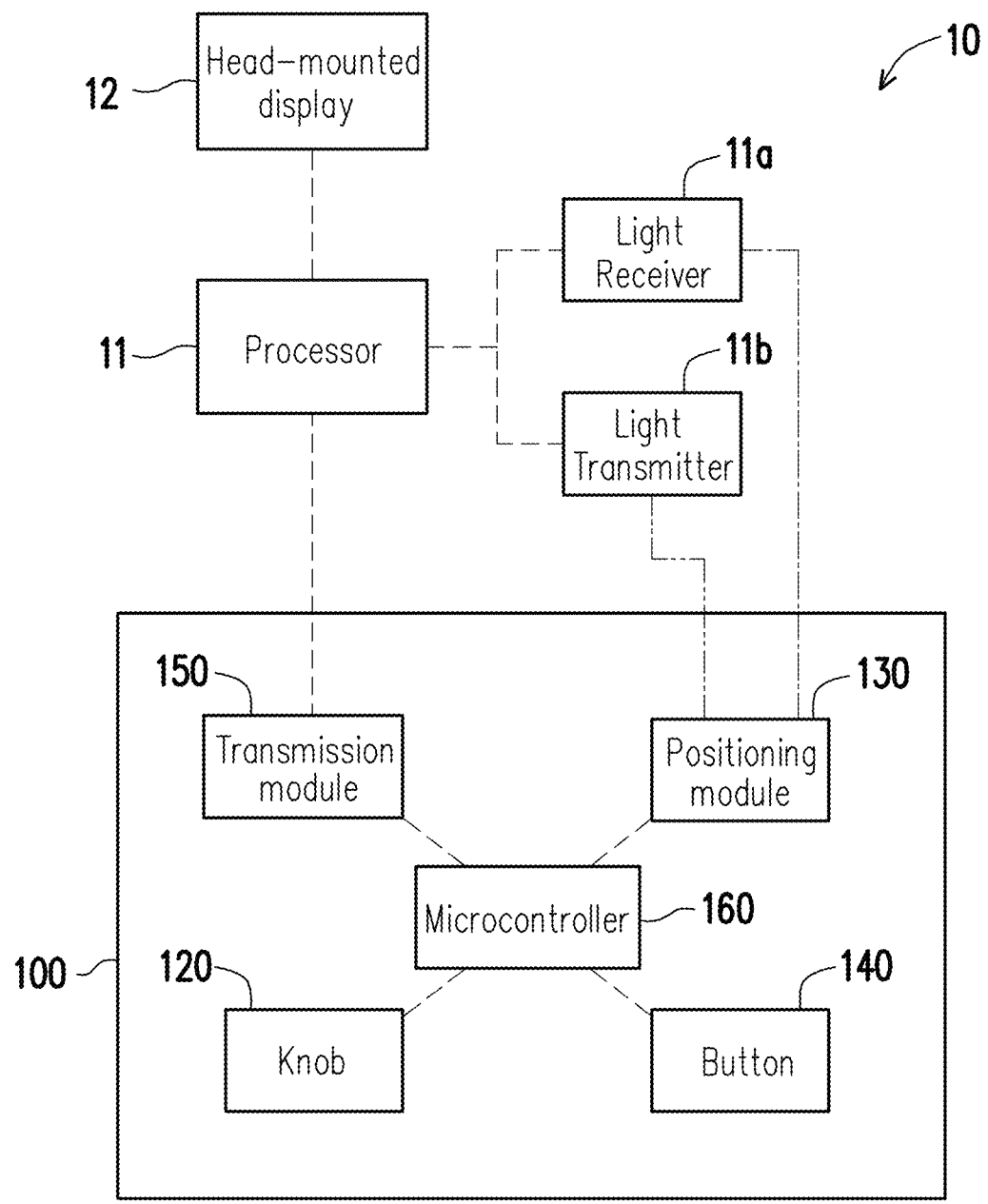
FIG. 4 is a block diagram of the handheld controller of FIG. 1A applied to another virtual reality system.

Referring to FIG. 4, compared with the virtual reality system 10 of FIG. 3, the virtual reality system 10 of FIG. 4 may further include a processor 11. When the positioning module 130 is a single point light source, a point light source array, or a patterned light source, the processor 11 may be electrically connected to a light receiver 11a to receive the light emitted by the positioning module 130 and generate the position data. In addition, when the positioning module 130 is a light sensing array, the processor 11 may be electrically connected to a light transmitter 11b, and the positioning module 130 may receive the light emitted by the light transmitter 11b and generate the position data. Therefore, in practical applications, the positioning module 130 itself may generate the position data. Alternatively, the positioning module 130 may also cooperate with the light receiver 11a or the light transmitter 11b to generate the position data.

Figure 5:
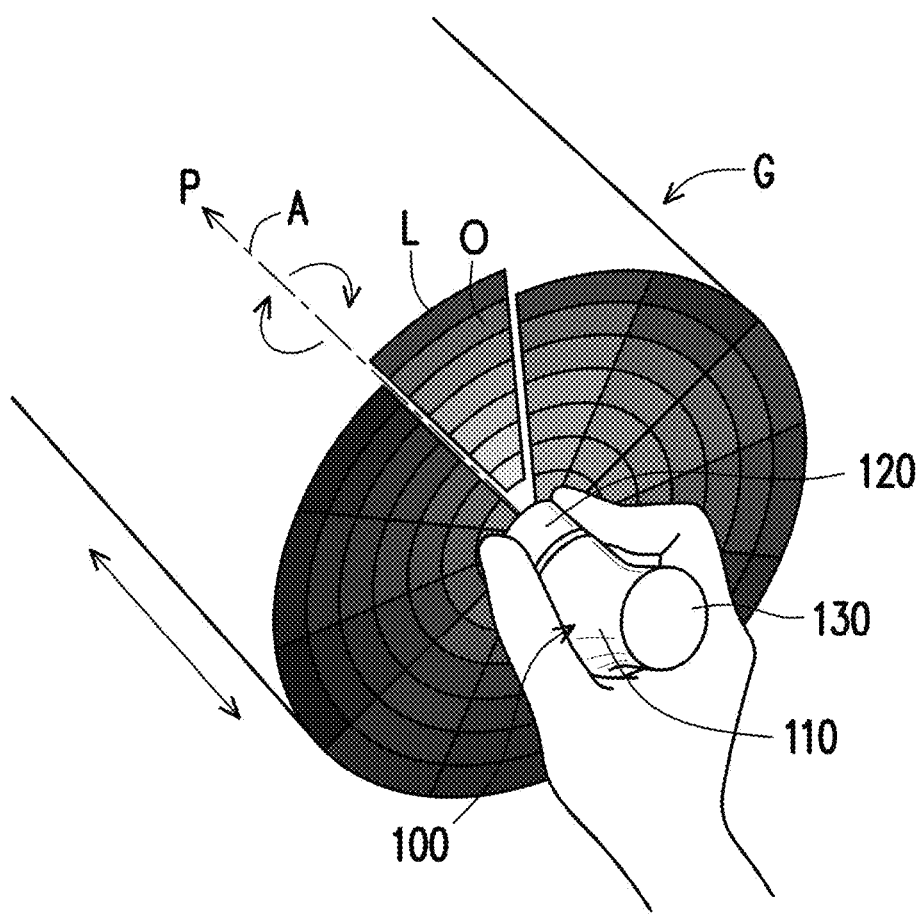
FIG. 5 is a schematic diagram of controlling a graphical user interface using the handheld controller of FIG. 1A.

Referring to FIG. 5, for example, the image displayed by the head-mounted display 12 of FIG. 3 or FIG. 4 includes a graphical user interface G, which includes multiple menus L in an annular arrangement, and the menus L have multiple options O in a linear arrangement. During operation, the user may rotate the knob 120 to select the menu L, and may move the handheld controller 100 back and forth to select the option O. Specifically, the user may rotate the knob 120 and switch to the selected menu L according to the rotation angle calculated from the angle data of the knob 120. Then, the user may move the handheld controller 100 back and forth in the pointer direction P, and switch to the selected option O according to the movement direction and movement amount calculated by the position data of the positioning module 130. Finally, the user may confirm the selected option O by using the pressing data generated by pressing the button 140, and execute the corresponding command according to the confirmed option O. The above-mentioned steps may be performed by the head-mounted display 12, an external processor, or cloud computing, so that the user may control the graphical user interface G.

More specifically, the handheld controller 100 may output the angle data, the position data, and/or the pressing data of the button 140, so the graphical user interface G may be designed with various user interfaces or operation modes based on these parameters. The above-mentioned portion of FIG. 5 is only for illustration, and is not intended to limit the software application field of the disclosure.

To sum up, in the disclosure, since the pointer direction of the handheld controller is coaxial with or parallel to the rotation axis of the knob, the user may output angle data by simultaneously moving the pointer direction of the handheld controller and rotating the knob, to provide rotational adjustment. In addition, the image displayed by the head-mounted display is changed according to the angle data generated by the knob, to provide more precise control of the virtual reality system.

What is claimed is:

1. A handheld controller, suitable for controlling a virtual reality system, the handheld controller having a pointer direction corresponding to the virtual reality system, the handheld controller comprising:
   a holding portion, suitable to be held by a hand of a user;
   a knob, pivotally connected to the holding portion on a rotation axis, wherein the rotation axis is coaxial with or parallel to the pointer direction; and
   a positioning module, connected to the holding portion and configured to provide a position of the holding portion in a three-dimensional space, wherein the positioning module comprises an inertial measurement unit, a point light source, a point light source array, a patterned light source, a light sensing array, or at least one camera lens.

2. The handheld controller according to claim 1, further comprising:
   a button, disposed on the holding portion and configured to be pressed by a finger of a user.

3. The handheld controller according to claim 1, further comprising:
   a wearable portion, connected to the holding portion and configured to be worn by a finger of a user.

4. The handheld controller according to claim 1, wherein the holding portion, the knob, and the positioning module are arranged in a Y-shape.

5. The handheld controller according to claim 1, wherein the holding portion, the knob, and the positioning module are arranged in an I-shape.

6. A control method, suitable for controlling a virtual reality system, the virtual reality system comprising a head-mounted display and a handheld controller, wherein the head-mounted display is suitable for displaying an image, and the handheld controller comprises a holding portion, a knob, a microcontroller, a positioning module, and a transmission module, wherein the microcontroller is electrically connected to the knob, the positioning module, and the transmission module, the holding portion is suitable to be held by a hand of a user, the knob is pivotally connected to the holding portion on a rotation axis, the rotation axis is coaxial with or parallel to a pointer direction, the knob generates angle data, the positioning module is connected to the holding portion and is configured to provide a position of the holding portion in a three-dimensional space, wherein the positioning module comprises an inertial measurement unit, a point light source, a point light source array, a patterned light source, a light sensing array, or at least one camera lens, the positioning module generates position data, and the transmission module is suitable for wireless transmission with the head-mounted display, the control method comprising:
   changing the image displayed by the head-mounted display based on the angle data and/or the position data.

7. The control method according to claim 6, further comprising:
   changing the image displayed by the head-mounted display based on a component of the position data along the rotation axis.

8. The control method according to claim 6, wherein the image displayed by the head-mounted display comprises a graphical user interface, the graphical user interface comprises a plurality of menus in an annular arrangement, each of the menus comprises a plurality of options in a linear arrangement, and one of the menus is selected and one of the options corresponding to the menu being selected is selected to change the graphical user interface based on the angle data and the position data.

9. The control method according to claim 6, wherein the handheld controller further has a button, and the button is disposed on the holding portion and generates pressing data, the control method further comprising:
   changing the image displayed by the head-mounted display based on the angle data and/or the position data and the pressing data.

* * * * *